Patented Oct. 19, 1937

2,095,994

UNITED STATES PATENT OFFICE 2,095,994

MAKING TRI-CALCIUM PHOSPHATE

Walter H. MacIntire, Knoxville, Tenn.

No Drawing. Application July 29, 1935,
Serial No. 33,663

3 Claims. (Cl. 23—109)

(Granted under the act of March 3, 1883, as
amended April 30, 1928; 370 O. G. 757)

The application is made under the act of April 30, 1928, and the invention herein described, if patented, may be manufactured and used by or for the Government for governmental purposes without the payment to me of any royalty thereon.

This invention relates to the production of tri-calcium phosphate and more particularly to the manufacture of a product of high purity.

One of the objects of this invention is to produce a normal non-basic tri-calcium phosphate. Another object of this invention is to produce tri-calcium phosphate of high purity, including freedom from fluorine compounds, for use in the treatment of humans and domestic animals for calcium deficiency. Other objects of this invention include the production of a tri-calcium phosphate suitable for use in the preparation of food materials.

It has been proposed that tri-calcium phosphate be made by mixing aqueous solutions of calcium salts, such as the chloride, with tri-sodium phosphate and by washing the precipitate thoroughly free from sodium chloride; by passing gaseous ammonia into an aqueous solution-suspension of mono-calcium phosphate and calcium sulfate and by washing to remove the ammonium sulfate formed; and by heating an intimate mixture of lime and an excess of phosphoric acid and by neutralizing the excess of acid with calcium hydroxide. These and other processes, of which the above examples are illustrative have certain disadvantages, each of which may include one or more of the following: First, the rapid hydration of calcium phosphates at the time of formation militates against obtaining non-basic products when soluble calcium salts and soluble phosphates are brought together in usual aqueous solutions and second, the impurities contained in the raw materials, particularly fluorine, are not eliminated in the process of manufacture.

I have discovered the process of making tri-calcium phosphate of high purity by substantially saturating sugar solutions with calcium hydroxide, by reacting the calcium oxide equivalent of the solution with concentrated phosphoric acid so that immediate reaction and equilibrium are obtained, and by breaking down the thick gelatinous mass which is first formed to a fine precipitate which is easily filtered or centrifuged and washed.

One example is given for the operation of my invention. A cane sugar solution, containing 20 to 25 parts by weight of sucrose, is treated with fine granular unslaked lime until the solution is substantially saturated and contains 5 to 6 parts by weight of calcium oxide equivalent. The density of this solution is approximately 1.07. The undissolved portion of the lime used is filtered from the solution and the chemical equivalent of the calcium oxide in the sucrose solution, in the ratio of 3 mols of CaO to 2 mols of phosphoric acid, in the form of 85% by weight $H_3PO_4$, is added to the sucrose solution while the latter is being agitated vigorously. The agitation of the mixture is continued for 30 minutes in which time the thick gelatinous mass which is first formed is converted into a finely divided white precipitate. This precipitate is filtered from the neutral regenerated sucrose solution and is washed with water saturated with tri-calcium phosphate. The dried precipitate is found to have a $CaO:P_2O_5$ ratio of 1.0:0.844. This corresponds to tricalcium monohydrate, $$Ca_3(PO_4)_2 \cdot H_2O,$$

which has been confirmed by the powder X-ray diffraction method using copper K $\alpha$ radiation with cameras having a 3.50 cm. radius. The product is free of fluorine.

It is evident that there are numerous factors which will influence conditions for the most satisfactory operation of my invention, the actual limits of which cannot be established except by detailed study of each set of raw materials and intermediate and finished products involved.

The sugar solution used in my process may be a solution of sucrose, dextrose or laevulose, or any suitable mixture containing any combination of these sugars. The concentrations of the sugar solutions used have been found to be preferably those that contain 20 to 25% by weight of the sugar. The actual limits of concentration for the sugar solution are defined, on the lower limit by the decrease in solubility of the calcium hydroxide and the increase in solubility of fluorine compounds and other impurities, and on the upper limit by the maximum viscosity for such solutions as can still be filtered or centrifuged satisfactorily. When a sucrose solution is used as the solvent, the resulting solution may be considered to be a true solution of calcium hydroxide or to be a solution of calcium sucrate.

The solution of calcium hydroxide in the sugar solution may be obtained by the use of burnt lime produced from a high-grade limestone, by the use of the product obtained by calcining high-grade dolomite, or by the use of high-grade hydrated lime.

The concentrated phosphoric acid used should contain at least 75% by weight $H_3PO_4$. In using phosphoric acid of higher concentrations there will be a slight concentration of the regenerated sugar solution, since some of the water contained is removed from the hydrated product. Using solutions at lower concentrations will result in a slight dilution of the regenerated sugar solution. In either case the adjustment of the concentration of the regenerated sugar solution can be made before again using it to obtain a substantially saturated solution of calcium hydroxide.

Under all conditions which have been investigated it has been found necessary to add the concentrated phosphoric acid to the sugar solution containing calcium hydroxide, while the latter is being agitated vigorously. This agitation is continued until the gelatinous mass originally formed is converted into a fine precipitate. The time required for this transaction will vary, depending upon the temperature and other conditions of agitation.

The filtration to remove the impurities from the sugar solution containing the calcium hydroxide and the filtration of the precipitated tri-calcium phosphate may be accomplished by standard filtration methods but is preferably obtained by centrifuging the respective mixtures.

The precipitated tri-calcium phosphate may be washed with cold water but it is preferably washed with water saturated with tri-calcium phosphate. The washed precipitate is dried and the resulting product is ready for use as a food or pharmaceutical material.

The regenerated sugar solution may be used directly or after adjustment of concentration in preparing additional quantities of the tri-calcium phosphate. When a solution of cane sugar is used, the hydration of a small proportion of the sucrose may occur but this change does not in any way affect the operation of the process except a slight change in the solubility of calcium hydroxide in the sugar solution.

It will be seen, therefore, that this invention actually may be carried out with the modification of certain details without departing from its spirit or scope.

I claim:

1. Process of making tri-calcium phosphate of high purity which comprises treating an aqueous solution of sugar containing 20 to 25 parts by weight of sucrose with fine, granular, unslaked lime, to produce a solution containing 5 to 6 parts by weight of calcium oxide equivalent; separating the sugar solution from undissolved material; adding 2 mols of 80 to 90% by weight phosphoric acid to the quantity of the separated sugar solution which contains 3 mols of calcium oxide equivalent, with vigorous agitation of the solution during the addition of the phosphoric acid, to form a gelatinous mass; continuing the agitation until the gelatinous mass forms a fine, white precipitate of tri-calcium phosphate; separating the fine precipitate from the sugar solution; washing the fine precipitate free from the sugar solution; drying the fine precipitate; and reusing the sugar solution separted from the fine precipitated phosphate in the preparation of the solution of calcium hydroxide in making additional tri-calcium phosphate.

2. Process of making tri-calcium phosphate of high purity which comprises saturating a sugar solution with calcium oxide using the highest concentration of sugar which will still permit the solution to be filtered; separating the sugar solution from undissolved material; adding 2 mols of concentrated phosphoric acid to the quantity of the separated sugar solution which contains 3 mols of calcium oxide equivalent, with vigorous agitation of the solution during the addition of the phosphoric acid, to form a gelatinous mass; continuing the agitation until the gelatinous mass forms a fine, white precipitate of tri-calcium phosphate; and separating the fine precipitate from the sugar solution.

3. Process of making tri-calcium phosphate of high purity which comprises preparing a solution of calcium oxide in an aqueous sugar solution of such concentration that the tri-calcium phosphate precipitated in it will not be appreciably hydrated, and the viscosity of the solution is sufficiently low to permit the separation of the precipitated tri-calcium phosphate; precipitating tri-calcium phosphate by the addition of concentrated phosphoric acid to the aqueous sugar solution, in substantially its mol. ratio to the calcium oxide equivalent of the sugar solution to form the phosphate, with vigorous agitation of the sugar solution during and following the addition of the phosphoric acid; and separating the sugar solution from the precipitated tri-calcium phosphate.

WALTER H. MacINTIRE.